United States Patent
Weh

(10) Patent No.: US 9,688,256 B2
(45) Date of Patent: Jun. 27, 2017

(54) HYDRAULIC BLOCK FOR A HYDRAULIC UNIT

(71) Applicant: Robert Bosch GmbH, Stuttgart (DE)

(72) Inventor: Andreas Weh, Sulzberg (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 14/651,756

(22) PCT Filed: Oct. 22, 2013

(86) PCT No.: PCT/EP2013/072091
§ 371 (c)(1),
(2) Date: Jun. 12, 2015

(87) PCT Pub. No.: WO2014/090465
PCT Pub. Date: Jun. 19, 2014

(65) Prior Publication Data
US 2015/0314760 A1    Nov. 5, 2015

(30) Foreign Application Priority Data
Dec. 14, 2012   (DE) .................. 10 2012 223 172

(51) Int. Cl.
*F15B 13/08*   (2006.01)
*F16K 27/00*   (2006.01)
*B60T 8/36*    (2006.01)

(52) U.S. Cl.
CPC ............ *B60T 8/368* (2013.01); *F15B 13/086* (2013.01); *F15B 13/0814* (2013.01); *Y10T 137/87877* (2015.04); *Y10T 137/87885* (2015.04)

(58) Field of Classification Search
CPC ..... Y10T 137/87877; Y10T 137/87885; B60T 8/368; F15B 13/0814; F15B 13/086
(Continued)

(56) References Cited

U.S. PATENT DOCUMENTS 3,934,605 A * 1/1976 Legris ..................... F16L 37/26
                                                       137/271
4,712,578 A * 12/1987 White ..................... F16L 41/03
                                                       137/269
(Continued)

FOREIGN PATENT DOCUMENTS

DE              101 14 298 A1    5/2002
DE       10 2007 047 124 A1      4/2009
(Continued)

OTHER PUBLICATIONS

International Search Report corresponding to PCT Application No. PCT/EP2013/072091, mailed Jan. 28, 2014 (German and English language document) (7 pages).

*Primary Examiner* — Seth W Mackay-Smith
(74) *Attorney, Agent, or Firm* — Maginot, Moore & Beck LLP

(57) ABSTRACT

A hydraulic block for a hydraulic unit is configured to control the brake pressure in a slip-controlled vehicle brake system. Multiple pressure sensors are received in receptors that are defined by the hydraulic block and that are configured to place each of the pressure sensors in hydraulic contact with a respective brake circuit. The pressure sensors are configured to detect wheel brake pressures in the corresponding brake circuits. The hydraulic contact between the pressure sensors and the brake circuits is enabled by a common duct that includes a shut-off element configured to block a pressure medium connection between the brake circuits.

11 Claims, 3 Drawing Sheets

(58) Field of Classification Search
USPC .......................................... 303/119.3, DIG. 10
See application file for complete search history.

(56) References Cited

U.S. PATENT DOCUMENTS

| | | | | |
|---|---|---|---|---|
| 5,494,071 A * | 2/1996 | Bell | ............................ | G01F 1/34 137/597 |
| 6,065,494 A * | 5/2000 | Thomsen | ................. | F15B 13/02 137/269 |
| 6,312,061 B1 * | 11/2001 | Schliebe | .................... | B60T 8/00 303/20 |
| 6,397,800 B2 | 6/2002 | Nohara et al. | | |
| 6,397,880 B1 * | 6/2002 | Stoll | ...................... | F15B 13/085 137/271 |
| 2006/0181143 A1 * | 8/2006 | Yamamoto | .............. | B60T 8/368 303/87 |
| 2007/0108836 A1 * | 5/2007 | Feigel | ..................... | B60T 8/368 303/115.1 |
| 2011/0047999 A1 * | 3/2011 | Koyama | ................. | B60T 8/368 60/459 |

FOREIGN PATENT DOCUMENTS

| | | |
|---|---|---|
| DE | 10 2010 039 617 A1 | 3/2011 |
| EP | 1 134 141 A2 | 9/2001 |
| EP | 1 707 463 A2 | 10/2006 |
| EP | 1 930 218 A2 | 6/2008 |
| JP | 10-291472 A | 11/1998 |
| JP | 2001-280523 A | 10/2001 |
| JP | 2009-6854 A | 1/2009 |
| JP | 2010-510446 A | 4/2010 |
| JP | 4575170 B2 | 11/2010 |

* cited by examiner

US 9,688,256 B2

HYDRAULIC BLOCK FOR A HYDRAULIC UNIT

This application is a 35 U.S.C. §371 National Stage Application of PCT/EP2013/072091, filed on Oct. 22, 2013, which claims the benefit of priority to Serial No. DE 10 2012 223 172.2, filed on Dec. 14, 2012 in Germany, the disclosures of which are incorporated herein by reference in their entirety.

BACKGROUND

The disclosure proceeds from a hydraulic block for a hydraulic unit for controlling the brake pressure of a vehicle brake system with traction control.

DE 10 2007 047 124 A1, for example, discloses a hydraulic unit having such a hydraulic block. This hydraulic unit controls the brake pressure in two brakes circuits hydraulically separated from one another. For registering the brake pressure prevailing in the two brake circuits, sockets for multiple pressure sensors are formed on the hydraulic block, wherein at least one pressure sensor is assigned to each brake circuit. For production engineering reasons and design space reasons these sockets are in each case arranged at the internal, closed end of a fluid-ducting blind bore. The number of blind bores provided therefore corresponds to the number of sockets or pressure sensors.

Blind bores are produced by a metal cutting process, for example by boring, and thereby account for a significant proportion of the machining costs of a hydraulic block. Furthermore, only a limited block volume is available on the hydraulic block in which to accommodate these blind bores. A minimum interval between the blind bores is necessary in order to prevent the possibility of fluid under high pressure passing from the one brake circuit into the other brake circuit. The block volume, of necessity therefore, increases with the number of bores and sockets on a hydraulic block. The blind bores moreover open out onto the surroundings of the hydraulic block and in the area of their orifice must be sealed by a closing element, preferably in the form of a pressed-in ball. The number of closing elements increases the number of components, the assembly outlay and the weight of the hydraulic unit, along with the risk of an unacceptable leakage.

SUMMARY

A hydraulic block according to the disclosure, on the other hand, has the advantage that the hydraulic contact of the pressure sensors assigned to the different brake circuits is represented solely by one single outwardly led duct. A single duct is more easily accommodated between the already tightly packed openings and connections on the hydraulic block than multiple ducts and accordingly contributes less to the enlargement of the block volume.

From a production engineering standpoint the duct can be simply described as a blind bore which opens onto an outer side of the hydraulic block and is sealed in the orifice area by a closing element. A single duct can be produced more cost effectively, minimizes the number of apertures to be sealed on the hydraulic block and thereby reduces the risk of unwanted leaks during manufacture and in particular under operating conditions, compared to a hydraulic block having a plurality of such ducts.

Further advantages or advantages developments of the disclosure ensue from the claims, drawings, and/or from the description below.

A hydraulic contact of the duct with both brake circuits is possible by means of extremely short branch ducts and in a direct route, which minimizes pressure losses, idle fluid volumes and the hydraulic elasticity of the brake circuit. The branch ducts originate in existing sockets for solenoid valves and are sealed when fitting these solenoid valves. Additional closing elements can be dispensed with, saving further components, production outlay, block volume, weight and costs.

A hydraulic separation of the two brake circuits is achieved by a shut-off element anchored in the duct according to the disclosure. This element can be anchored, for example, by simply pressing it into the duct. The duct advantageously has a step, in the area of which the shut-off element is arranged.

In an advantageous development of the disclosure the shut-off element for separating the brake circuits and the closing element for outwardly sealing the duct are combined into one single component. This is particularly cost-effective to fit in just one operation.

Highly integrated hydraulic units affording hydraulic blocks of geometrically robust design, compact dimensions, low weight, ease of machining in manufacture and low assembly costs represent a significant competitive advantage, particularly in vehicle construction.

An exemplary embodiment of the disclosure is represented in the drawing and explained in detail in the following description.

BRIEF DESCRIPTION OF THE DRAWINGS

In FIG. 1 the hydraulic block is viewed looking towards a front face, towards which the sockets provided for the solenoid valves open out.

FIG. 2 shows the view towards the rear face of the hydraulic block opposite the front face, which serves for the attachment of an electric motor for driving pump elements, which are fitted in corresponding sockets.

DETAILED DESCRIPTION

Figure 1:
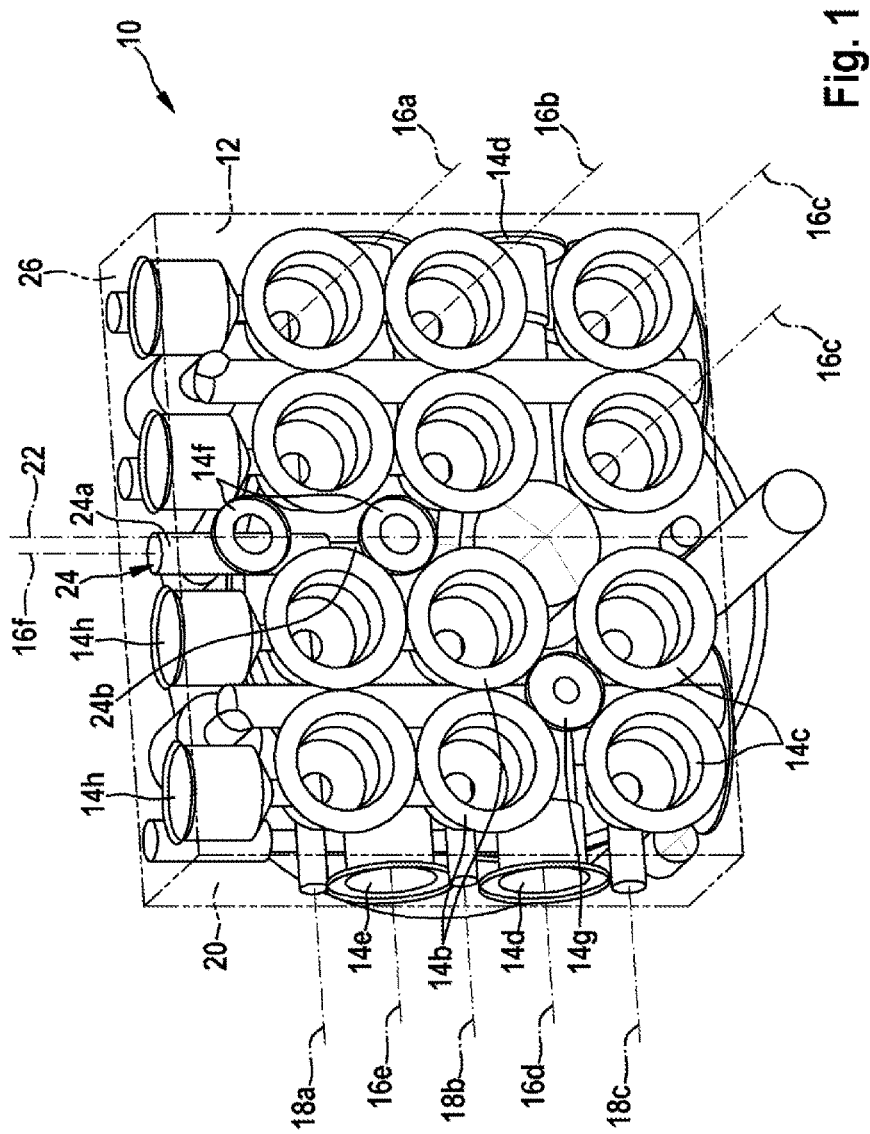
FIGS. 1 and 2 each show perspective views of a hydraulic block according to the disclosure with sockets and ducts necessary for understanding the disclosure.

FIG. 1 shows a hydraulic block 10, particularly for a hydraulic unit for controlling the brake pressure in a vehicle brake system with traction control. This hydraulic block 10 is a cuboid formation which is preferably made from metal by continuous casting. Opening out onto the front face 12 of this hydraulic block 10 facing the viewer in FIG. 1 are sockets 14*a*, 14*b*, 14*c*, which are intended to accommodate solenoid valves. In total, twelve such sockets 14 are provided, for example, the longitudinal axes 16 of which are aligned parallel to one another and perpendicular to the front face 12 of the hydraulic block 10. Four of these sockets 14 are arranged in each straight row 18 running horizontally, a total of three such rows 18*a*, 18*b*, 18*c* being formed parallel to one another at different heights on the hydraulic block 10. The sockets 14*a* assigned to the first, top row 18*a* are intended to accommodate valves which control a pressure build-up in the wheel brakes of a vehicle brake system that can be connected to the hydraulic block 10. Sockets 14*b*, which are intended to accommodate valves which control a pressure reduction in these wheel brake of the vehicle brake system, are situated along an underlying second row 18*b*.

Below this in turn in the third, bottom row 18c, sockets 14c are formed for valves which switch the vehicle brake system from the service braking mode into the traction control mode or which control a supply of fluid to pressure generators likewise provided on the hydraulic block 10.

Sockets 14d for these pressure generators are situated between the second row 18b and the underlying third row 18c, in an arrangement in which their longitudinal axes 16d run parallel to the three rows 18, The sockets 14d assigned to the pressure generators each open out towards one of the opposite side faces 20 of the hydraulic block 10. Of these side faces only the left-hand side face 20 of the hydraulic block 10 is visible in FIG. 1.

Above the sockets 14d for the pressure generators, sockets 14e are provided for damper elements. Their longitudinal axes 16e likewise run parallel to the three rows 18a, 18b, 18c of the sockets 14 of the valves and to the sockets 14d of the two pressure generators. These too open out towards opposite side faces 20 of the hydraulic block 10.

Sockets 14f and 14g for a total of three pressure sensors are furthermore provided on the hydraulic block. The sockets 14f for a first pressure sensor and for a second pressure sensor are situated one perpendicularly above another on an imaginary central axis 22 running vertically through the hydraulic block 10, which divides this into a left-hand and a right-hand part. The sockets 14 in the left-hand part and the sockets 14 in the right-hand part of the hydraulic block 10 are each connected to a hydraulic circuit by means of connecting ducts. The two hydraulic circuits are separated from one another, that is to say no fluid connection exists between the two hydraulic circuits, so that in the event of one brake circuit failing the other brake circuit remains serviceable. The socket 14f for the first pressure sensor is situated above the first row 18a of sockets 14a for valves and the socket 14f of the second pressure sensor lies between this first row 18a and the second row 18b of valve sockets. A socket 14g for the third pressure sensor is situated at the center of an imaginary square, the corners of which is formed by the longitudinal axes 16b and 16c of the sockets 14b and 14c of the valves in rows 18b and 18c in the left-hand part of the hydraulic block 10 in FIG. 1.

According to the disclosure the hydraulic contact of the sockets 14f for the first pressure sensor and the second pressure sensor is provided by a common duct 24. This takes the form of a blind bore, which opens out towards an upper side 26 of the hydraulic block 10 visible in FIG. 1. Sockets 14h for the hydraulic connections of the wheel brakes also open out on this upper side 26. In total four such sockets 14h are arranged side by side.

A longitudinal axis 16f of the blind bore forming the common duct 24 runs perpendicular to the rows 18 of sockets for the valves in the area of the central axis 22 of the hydraulic block 10. The blind bore has one step in its inside diameter and is thereby subdivided into two bore portions 24a and 24b of differing inside diameters. The duct 24 has the bore portion 24a of larger diameter in the area where it opens out into the surroundings, whilst the bore portion 24b, on the other hand, situated in the interior of the hydraulic block 10 and forming the closed end, is reduced in its inside diameter. The transition from the bore portion 24a of larger inside diameter to the bore portion 24b of smaller inside diameter may be designed as a right-angled step or as a taper, for example.

Figure 2:
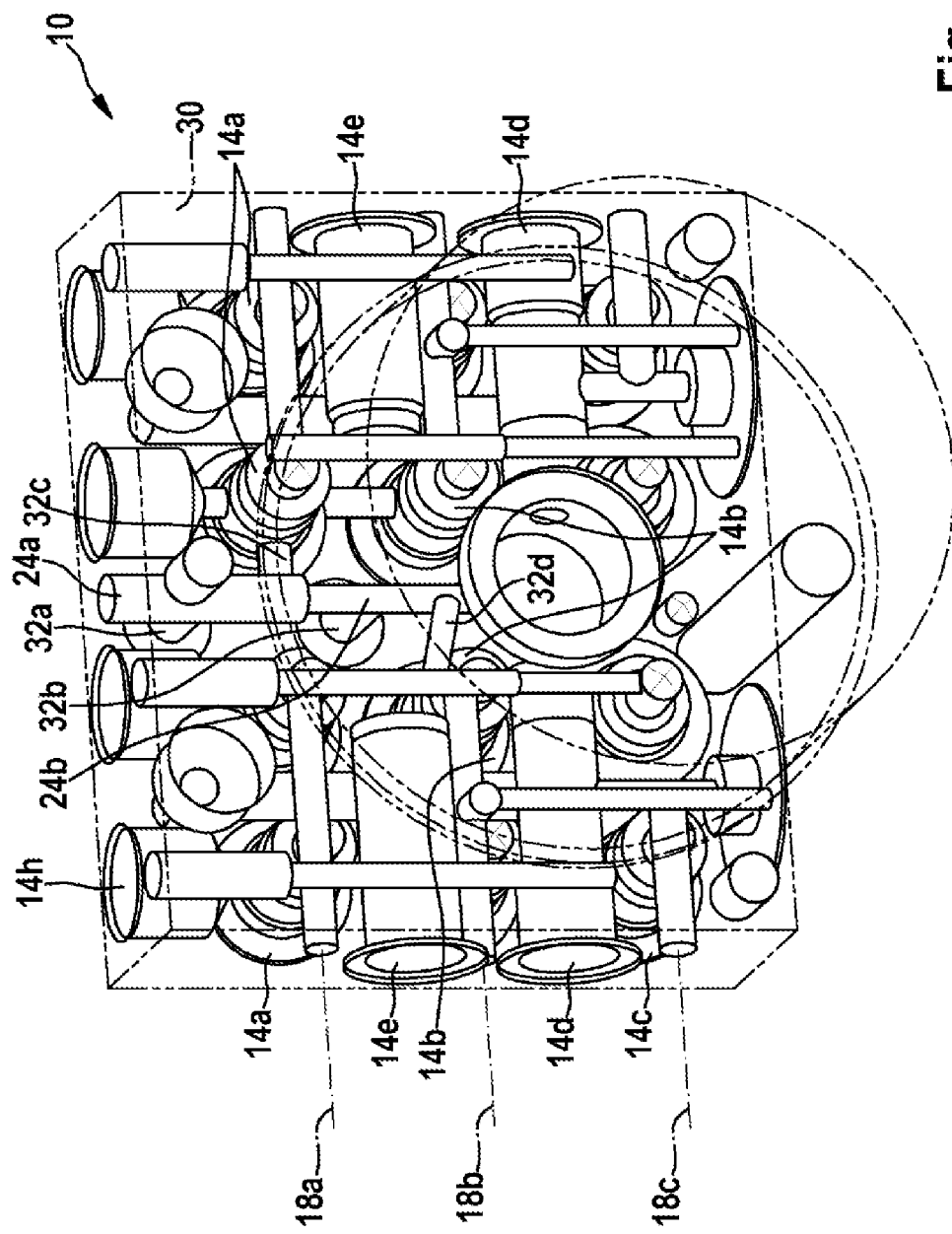

FIG. 2 shows the hydraulic block 10 described above from behind and thereby affords the viewer a view of its rear face 30. Corresponding elements are identified by the same reference numerals in FIG. 1 and FIG. 2. FIG. 2 shows the hydraulic contact of the common duct 24 with the sockets 14a, 14b for the valves in rows 18a, 18b on the one hand and the hydraulic contact of the common duct 24 with the sockets 14f of the pressure sensors on the other. The latter contact ensues via first and second branch ducts 32a and 32b, which run perpendicular to the front face 12 and the rear face 30 of the hydraulic block 10 and thereby connect the common duct 24 by the shortest possible route to the sockets 14f of the pressure sensors. FIG. 2 furthermore shows third and fourth branch ducts 32c, 32d, which are led in a straight line and at an angle of other than 90° towards the front face 12 and the rear face 30 of the hydraulic block 10, and which each connect the common duct 24 to one of the laterally inner sockets 14a and 14b for valves. The third branch duct 32c establishes the connection of the socket 14f of the first pressure sensor to the socket 14a in the first row 18a in the right-hand part of the hydraulic block 10 in FIG. 2. This branch duct 32a opens into the bore portion 24a of the common duct 24 of larger inside diameter. The fourth branch duct 32d, which establishes the hydraulic contact between the socket 14f of the second pressure sensor and the inner socket 14b of the valve in the left-hand part of the hydraulic block 2 in the second row 18b, is connected to the bore portion 24b of the common duct 24 of smaller inside diameter. The sockets 14a and 14b provided with such contacts belong to different brake circuits. The two branch ducts 32c, 32d run in horizontal cross-sectional planes led on two different levels through the hydraulic block 10 shown. The selected inclination of the two angles of the branch ducts 32c, 32d can be seen to run in opposite directions.

Figure 3:
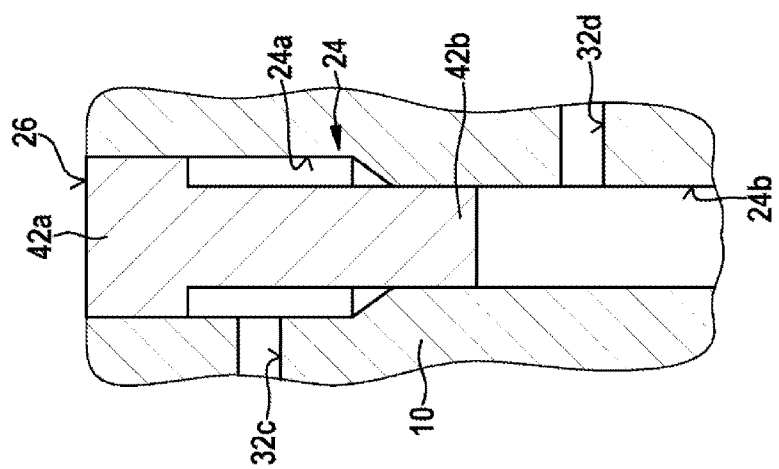
FIGS. 3 and 4 show different exemplary embodiments of shut-off and closing elements.
Figure 4:
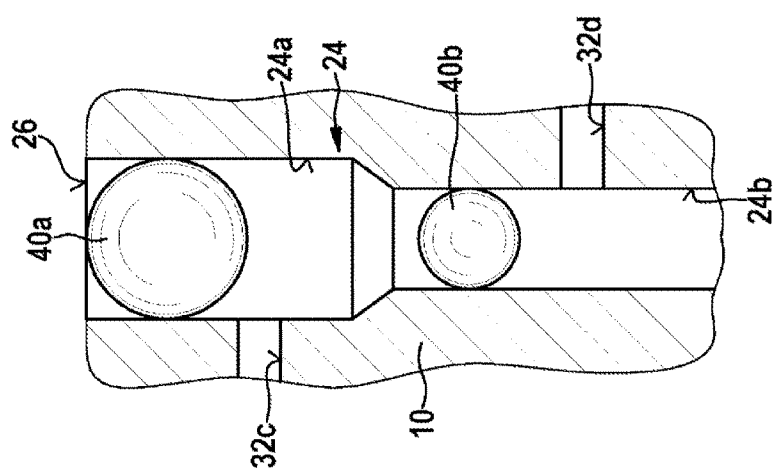

FIGS. 3 and 4 show the common duct 24 for the contact of the sockets 14f for the first pressure sensor and the pressure sensor in longitudinal section. The bore portions 24a and 24b can be seen, with their different inside diameters and with the transition provided between them, which here takes the form of a taper, for example. The open end of the duct 24 is situated on the upper side 26 of the hydraulic block 10 indicated by hatching. The mouth of the fourth branch duct 34d is shown at the inner, closed end of the duct 24. The third branch duct 32c arranged higher up on the hydraulic block 10 opens into the bore portion 24a of larger inside diameter from the opposite side. According to FIG. 3 the external orifice of the duct is sealed by means of a closing element 40a. A ball, which is pressed so that it is fluid-tight into the bore portion 24b in the area where the duct 24 opens out into the surroundings, is provided for this purpose. A shut-off element 40b, which here also takes the form of a ball, is pressed into the bore portion 24b of smaller diameter shortly after the transition between the two bore portions 24a, 24b. Instead of balls it is also possible, for example, to use cylindrical closing or shut-off elements (not shown) having diameters matched to the inside diameter of the associated bore portion 24a, 24b.

The shut-off element 40b separates the fluid connection that otherwise exists between the two hydraulic circuits, so that the common duct 24 comprises a bore portion 24a connected to the one hydraulic circuit and a second bore portion 24b connected to the other hydraulic circuit.

FIG. 4 shows an alternative embodiment of a shut-off and closing element 42, which is of a pin-shaped form and has a head 42a of a diameter matched to the bore portion 24a. This head 42a is integrally formed with a shank 42b of a diameter matched to the bore portion 24b. The length of the shank 42b here is selected so that this penetrates into the bore portion 24b of the duct 24 of smaller diameter and seals this as soon as the head 42a of the closing element 42 is pressed into the bore portion 24a of larger diameter and thereby seals the duct 24 off from the surroundings.

With a single pin-shaped shut-off and closing element 42 and a single pressing operation in a single duct 24 it is therefore possible both to separate the two hydraulic circuits from one another and to provide contacts for two pressure sensors with the two hydraulic circuits and finally to seal off the common duct 24 from the surroundings. This brings savings in overall space, weight, number of parts, production costs and assembly costs for the hydraulic block 10.

Modifications or additions to the exemplary embodiments described are naturally feasible, without departing from the basic idea of the disclosure.

The invention claimed is:

1. A hydraulic block for a hydraulic unit for controlling the brake pressure of a vehicle brake system with traction control, the hydraulic block defining:
    a plurality of sockets, each of which receives one of a pressure generator, a valve, and a pressure sensor;
    a plurality of fluid connections connecting a first set of the plurality of sockets to a first fluid circuit and connecting a second set of the plurality of sockets to a second fluid circuit, the first and second fluid circuits being hydraulically separated from each other, wherein a first pressure sensor is arranged in a first socket of the first set, and a second pressure sensor is arranged in a second socket of the second set; and
    a common duct hydraulically connected to the first and second sockets,
    wherein the hydraulic block includes a shut-off element fixed in the common duct at least partially between the first and second sockets so as to permanently prevent fluid communication through the common duct between the first and second fluid circuits.

2. The hydraulic block as claimed in claim 1, wherein the common duct is defined by a longitudinal bore that runs in a straight line and that is closed at each end.

3. The hydraulic block as claimed in claim 2, wherein:
    the common duct has a stepped shape in which a portion of the common duct from an outer end of the common duct to a step has a first diameter and a second portion of the common duct extending from the step away from the first portion has a second diameter; and
    the shut-off element is arranged in a region of the step.

4. The hydraulic block as claimed in claim 2, wherein:
    the common duct is further defined by a first bore portion having a first diameter and a second bore portion having a second diameter smaller than the first diameter; and
    the shut-off element of the common duct includes:
        an integral pin-shaped portion that has a head with a shape matched to a shape of the first bore portion;
        a shank that has a diameter that is smaller than a diameter of the head and that has a shape matched to the shape of the second bore portion; and
        the shank has a length configured such that the shut-off element seals off the second bore portion of the common duct when the head externally seals an orifice of the duct.

5. The hydraulic block as claimed in claim 1, wherein:
a first side of the hydraulic block defines further sockets configured to receive connections for wheel brakes; and
the common duct is defined by a blind bore, which opens out towards said first side of the hydraulic block.

6. The hydraulic block as claimed in claim 1, wherein the hydraulic block further defines:
    a first branch duct fluidly connecting the first socket to the common duct;
    a second branch duct fluidly connecting the second socket to the common duct;
    a third branch duct fluidly connecting a third socket of the first set to the common duct, the third socket receiving a first valve; and
    a fourth branch duct fluidly connecting a fourth socket of the second set to the common duct.

7. The hydraulic block as claimed in claim 6, wherein the third and the fourth branch ducts run in opposite directions towards each other and at angles of other than 90° to external faces of the hydraulic block.

8. The hydraulic block as claimed in claim 1, the plurality of sockets including:
    a first set of sockets that are configured to receive valves and that are located side by side in a straight first row on the hydraulic block; and
    a second set of sockets that are configured to receive valves and that are located side by side in a second row on the hydraulic block, which runs below and parallel to the first row;
    wherein the first socket, in which the first pressure sensor is arranged, is located above the first row and is connected one of the first set of sockets in the first row, and
    wherein the second socket, in which the second pressure sensor is arranged, is located between the first row and the second row, and is connected to one of the second set of sockets in the second row.

9. The hydraulic block as claimed in claim 8, wherein the common duct is in contact with the first and second sockets, and runs perpendicular to the first row and second row.

10. The hydraulic block as claimed in claim 8, the hydraulic block further defining additional sockets that are each configured to receive a connection with a wheel brake, the first socket being in fluid communication with a third socket of the additional sockets and the second socket being in fluid communication with a fourth socket of the additional sockets,
    wherein the third and fourth sockets are assigned to different fluid circuits of the at least two fluid circuits.

11. A hydraulic block for a hydraulic unit for controlling the brake pressure of a vehicle brake system with traction control, the hydraulic block defining:
    a plurality of sockets, each of which is configured to receive at least one of a pressure generator, a valve, and a pressure sensor;
    a plurality of fluid connections which are configured to connect sockets of the plurality of sockets to at least two fluid circuits that are hydraulically separated from each other, wherein at least one of the plurality of sockets is assigned to each of the at least two fluid circuits, a first socket of the assigned sockets is configured to receive a first pressure sensor and a second socket of the assigned sockets is configured to receive a second pressure sensor; and
    a common duct that hydraulically connects the first and second sockets which are assigned to different fluid circuits, the hydraulic block including a shut-off element arranged in the common duct, and that is configured to fluidically separate the at least two fluid circuits,
    wherein the shut-off element includes a ball, which is pressed into a bore portion of the common duct that has a diameter smaller than a diameter of the ball.

* * * * *